United States Patent
Williams

[11] Patent Number: 6,113,512
[45] Date of Patent: *Sep. 5, 2000

[54] FULL-TIME TRANSFER CASE WITH INTEGRATED PLANETARY GEAR ASSEMBLY AND SYNCHRONIZED RANGE SHIFT MECHANISM

[75] Inventor: Randolph C. Williams, Weedsport, N.Y.

[73] Assignee: New Venture Gear, Inc., Troy, Mich.

[*] Notice: This patent is subject to a terminal disclaimer.

[21] Appl. No.: 09/338,894

[22] Filed: Jun. 23, 1999

Related U.S. Application Data

[63] Continuation of application No. 08/990,305, Dec. 15, 1997, Pat. No. 5,947,858.

[51] Int. Cl.⁷ .................................................. B60K 17/35
[52] U.S. Cl. .......................................... 475/204; 475/206
[58] Field of Search ................................. 475/206–207

[56] References Cited

U.S. PATENT DOCUMENTS

| | | |
|---|---|---|
| 4,569,252 | 2/1986 | Harper . |
| 4,770,280 | 9/1988 | Frost . |
| 5,054,335 | 10/1991 | Andrews . |
| 5,105,902 | 4/1992 | Wilson et al. . |
| 5,284,068 | 2/1994 | Frost . |
| 5,346,442 | 9/1994 | Eastman . |
| 5,655,986 | 8/1997 | Wilson et al. . |
| 5,700,222 | 12/1997 | Bowen . |
| 5,702,321 | 12/1997 | Bakowski et al. . |
| 5,704,867 | 1/1998 | Bowen . |
| 5,902,205 | 5/1999 | Williams ................................. 475/204 |
| 5,951,429 | 9/1999 | Eastman ................................. 475/204 |
| 5,967,930 | 10/1999 | Ahluwalia ............................... 475/206 |

*Primary Examiner*—Khoi Q. Ta
*Attorney, Agent, or Firm*—Harness, Dickey & Pierce, P.L.C.

[57] ABSTRACT

A transfer case for a four-wheel drive vehicle having a planetary gear assembly which integrates a gear reduction unit and an interaxle differential into a common assembly. A synchronized range clutch is operably associated with the input to the planetary gear assembly and can be selectively shifted on-the-fly for establishing high-range and low-range speed ratios. A synchronized mode clutch is operably associated with the output of the planetary gear assembly and can be selectively shifted on-the-fly for establishing two-wheel, full-time four-wheel and locked four-wheel drive modes.

11 Claims, 4 Drawing Sheets

| MODE | RANGE SLEEVE | MODE SLEEVE |
|---|---|---|
| 2WD-H | H | 2WD |
| 4DIFF-H | H | 4DIFF |
| 4LOCK-H | H | 4LOCK |
| 4LOCK-L | L | 4LOCK |
| 4DIFF-L | L | 4DIFF |
| 2WD-L | L | 2WD |
| NEUTRAL | N | 2WD |
*Fig-3*
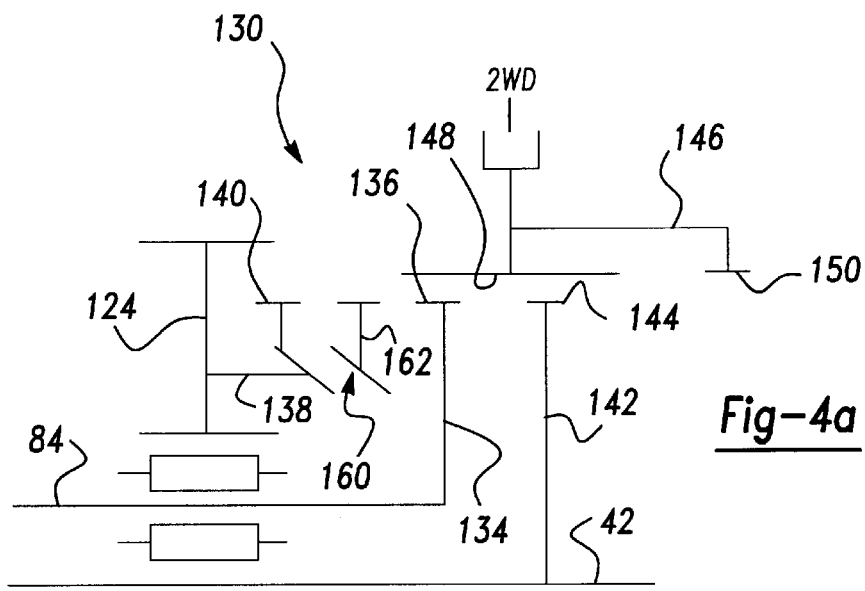
*Fig-4a*
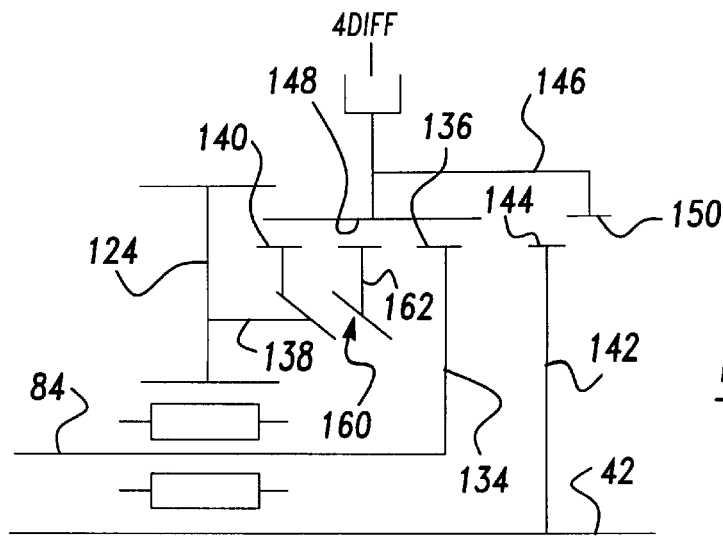
*Fig-4b*

FULL-TIME TRANSFER CASE WITH INTEGRATED PLANETARY GEAR ASSEMBLY AND SYNCHRONIZED RANGE SHIFT MECHANISM

This is a continuation of U.S. patent application Ser. No. 08/990,305, filed Dec. 15, 1997 now U.S. Pat. No. 5,947,858.

BACKGROUND OF THE INVENTION

The present invention relates generally to transfer cases for use in four-wheel drive vehicles. More particularly, the present invention relates to a full-time transfer case having a two-speed gear reduction unit and an interaxle differential integrated into a planetary gear assembly and a synchronized range shift mechanism for permitting on-the-fly shifting between high-range and low-range drive modes.

As is now conventional, many light-duty and sport-utility vehicles are equipped with a transfer case for transmitting drive torque to all four of the wheels, thereby establishing a four-wheel drive mode of operation. To accommodate differing road surfaces and conditions, many transfer cases are equipped with a gear reduction unit which can be selectively shifted to permit the vehicle operator to choose between a four-wheel high-range (i.e., direct ratio) drive mode and a four-wheel low-range (i.e., reduced ratio) drive mode. In many instances, the four-wheel drive vehicle must be stopped before the transfer case can be shifted between its four-wheel high-range and low-range drive modes. Unfortunately, the need to stop the vehicle prior to shifting between the available four-wheel high-range and low-range drive modes is inconvenient, particularly upon encountering road conditions or surface terrains where continuation of the vehicle's rolling momentum would assist in overcoming the conditions encountered. To alleviate a portion of this inconvenience, some gear reduction units have been designed which permit the vehicle operator to shift without stopping the vehicle (i.e., "on-the-fly") from the four-wheel low-range drive mode into the four-wheel high-range drive mode. For example, U.S. Pat. No. 5,054,335 discloses a transfer case equipped with a synchronized range shift arrangement for "on-the-fly" shifting of a layshaft-type gear reduction unit. Alternatively, commonly-owned U.S. Pat. No. 5,346,442 discloses a transfer case having a synchronized range shift arrangement for "on-the-fly" shifting of a planetary-type gear reduction unit. Finally, U.S. Pat. No. 4,569,252 discloses a planetary-type gear reduction unit which permits synchronized shifting into and out of the high-range drive mode and the low-range drive mode.

In addition to the gear reduction unit, many transfer cases are also equipped with a mode shift mechanism which permits the vehicle operator to selectively shift between a two-wheel drive mode wherein only the rear driveline is driven and a "part-time" four-wheel drive mode wherein the front driveline is rigidly coupled for rotation with the rear driveline. Reference may be made to commonly-owned U.S. Pat. No. 4,770,280 for disclosure of an exemplary part-time transfer case equipped with a gear reduction unit and a synchronized mode shift mechanism. In view of increased consumer popularity in four-wheel drive vehicles for everyday use, the mode shift mechanism in some two-speed transfer cases is replaced with an interaxle differential which is operable for continuously transmitting drive torque to both the front and rear drivelines while permitting speed differentiation therebetween. Reference may be made to commonly-owned U.S. Pat. No. 4,677,873 for disclosure of an exemplary full-time two-speed transfer case equipped with a gear reduction unit and a dual-planetary interaxle differential. In order to prevent traction loss due to excessive interaxle slip, some full-time transfer cases are also equipped with a limited slip device which is operable for selectively or automatically biasing the torque distribution ratio across the interaxle differential while preventing or regulating speed differentiation in response to the slip condition. In some systems, a lock-out clutch is manually-actuated to lock the interaxle differential. However, other full-time transfer cases are equipped with a hydraulic coupling or an electronically-controlled bias clutch for automatically regulating the amount of allowable speed differentiation across the interaxle differential.

In an effort to minimize the overall size of full-time transfer cases, it has been proposed to incorporate the gear reduction unit and the interaxle differential into a common planetary gear assembly. One such arrangement is described in U.S. Pat. No. 4,644,822 which discloses a transfer case having "back-to-back" first and second planetary gearsets with common components that can be selectively shifted to establish different four-wheel drive modes. Likewise, each of commonly-owned U.S. Pat. Nos. 5,284,068 and 5,411,447 discloses a full-time dual-speed transfer case equipped with an integrated planetary gear assembly that is shifted as a unit to establish the different available drive modes. Finally, U.S. Pat. Nos. 4,677,875, 4,344,335, 4,215,593 and 4,805,484 each disclose a transfer case having a common planetary gear assembly which is operable to establish various drive modes through manipulation of one or more suitable shift mechanisms. While such prior art arrangements provide a compact construction, there is a continuing need to develop low cost, simplified alternatives which meet modern requirements for low noise and weight.

SUMMARY OF THE INVENTION

It is therefore an object of the present invention to provide a transfer case for a full-time four-wheel drive vehicle having a planetary gear assembly which integrates a gear reduction unit and an interaxle differential into a common arrangement.

As an additional object, the transfer case includes a range shift mechanism which is operably associated with the input of the planetary gear assembly and which can be selectively actuated for establishing a full-time four-wheel high-range drive mode, a neutral mode, and a full-time four-wheel low-range drive mode.

As a related object of the present invention, a synchronized range shift mechanism is provided for permitting "on-the-fly" shifting of the transfer case between the full-time four-wheel high-range and low-range drive modes.

According to another object of the present invention, the transfer case includes a mode shift mechanism which is operable in conjunction with the outputs of the planetary gear assembly and which can be selectively actuated for establishing a locked four-wheel high-range drive mode, a locked four-wheel low-range drive mode, and a two-wheel high-range drive mode.

As a related object, a synchronized mode shift mechanism is provided for permitting on-the-fly shifting of the transfer case between the two-wheel drive high-range drive mode and the full-time four-wheel high-range drive mode when the front driveline is equipped with an axle disconnect mechanism.

According to a preferred embodiment of the present invention, the planetary gear assembly is operably installed between an input shaft and front and rear output shafts of the transfer case and is constructed in a compact arrangement. The planetary gear assembly includes a first planetary gearset and a second planetary gearset which are interconnected by a common carrier assembly. The first planetary gearset is operably installed between the input shaft and the second planetary gearset for driving the carrier assembly at either of a first speed ratio (i.e., "high-range") or a second speed ratio (i.e., "low-range") relative to the input shaft. The common carrier assembly acts as the input to the second planetary gearset which has first and second outputs respectively connected to the rear and front output shafts of the transfer case. Thus, the second planetary gearset is operable for permitting speed differentiation and distributing drive torque between the front and rear output shafts of the transfer case. A synchronized range shift mechanism is provided which includes a range clutch operable in a first range position for coupling the input shaft to a first component of the first planetary gearset for establishing the four-wheel high-range drive mode. The range clutch is operable in a second range position for coupling the input shaft to a second component of the first planetary gearset for establishing the four-wheel low-range drive mode. Finally, the range clutch is operable in a third range position to disconnect the input shaft from the first and second components of the first planetary gearset for establishing a Neutral mode.

As an additional feature, the transfer case can further includes a mode shift mechanism having a mode clutch which is movable between three mode positions. In the first mode position, the mode clutch couples the second output of the second planetary gearset to the front output shaft of the transfer case while permitting relative rotation between the first and second outputs of the second planetary gearset, thereby establishing the full-time four-wheel drive mode. In the second mode position, the mode clutch rigidly interconnects the front output shaft of the transfer case to the first and second outputs of the second planetary gearset for inhibiting relative rotation between the front and rear output shafts, thereby establishing the locked four-wheel drive mode. In the third mode position, the mode clutch interconnects the first and second outputs of the second planetary gearset to inhibit relative rotation therebetween and is uncoupled from the front output shaft of the transfer case such that all drive torque is transmitted to the rear output shaft, thereby establishing the two-wheel drive mode.

Additional objects, features and advantages of the present invention will become apparent from studying the following detailed description and appended claims when taken in conjunction with the accompanying drawings.

BRIEF DESCRIPTION OF THE DRAWINGS

FIG. 3 is a table listing the position of movable range and mode clutches for establishing a combination of speed ranges and drive modes available with the transfer case shown in FIG. 2;

FIGS. 4A through 4C are partial schematic drawings of an alternative mode shift mechanism adapted for use with the transfer case of the present invention;

DETAILED DESCRIPTION OF THE PREFERRED EMBODIMENTS

In general, the present invention relates to the combination of a gear reduction unit and an interaxle differential in an "integrated" planetary gear assembly. Preferably, the integrated planetary gear assembly is installed in the transfer case of a four-wheel drive motor vehicle for establishing several different combinations of speed ranges and drive modes. A synchronized range shift mechanism is operably associated with the input of the integrated planetary gear assembly for permitting "on-the-fly" shifting of the transfer case between a low-range speed ratio and a high-range speed ratio during motive operation of the motor vehicle. Additionally, a mode shift mechanism is operably associated with the outputs of the integrated planetary gear assembly for permitting shifting of the transfer case between a full-time (i.e., differentiated) four-wheel drive mode, a locked (i.e., non-differentiated) four-wheel drive mode, and a two-wheel drive mode.

Figure 1:
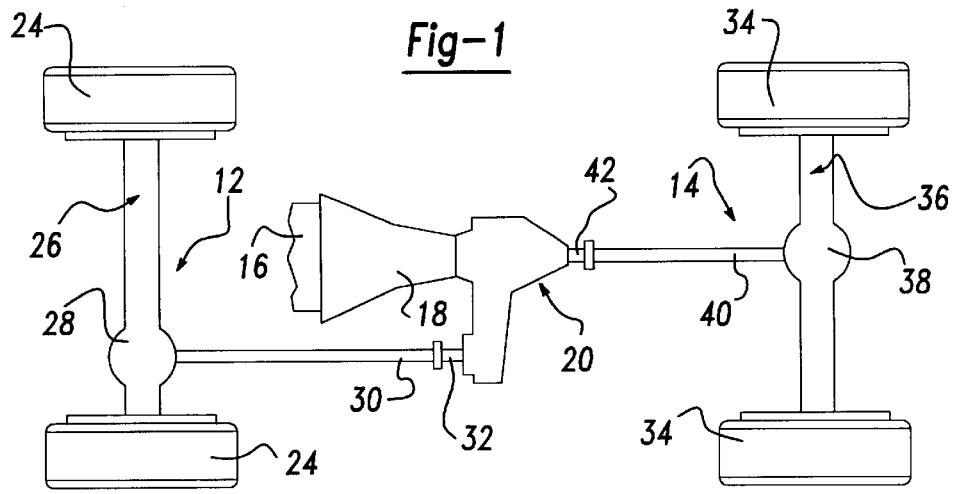
FIG. 1 illustrates the drivetrain of a four-wheel drive motor vehicle equipped with the transfer case of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is an full-time four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair or rear wheels 34 connected at opposite ends of a rear axle assembly 36 having a rear differential 38 coupled to one end of a rear propshaft 40, the opposite end of which is interconnected to a rear output shaft 42 of transfer case 20.

Figure 2:
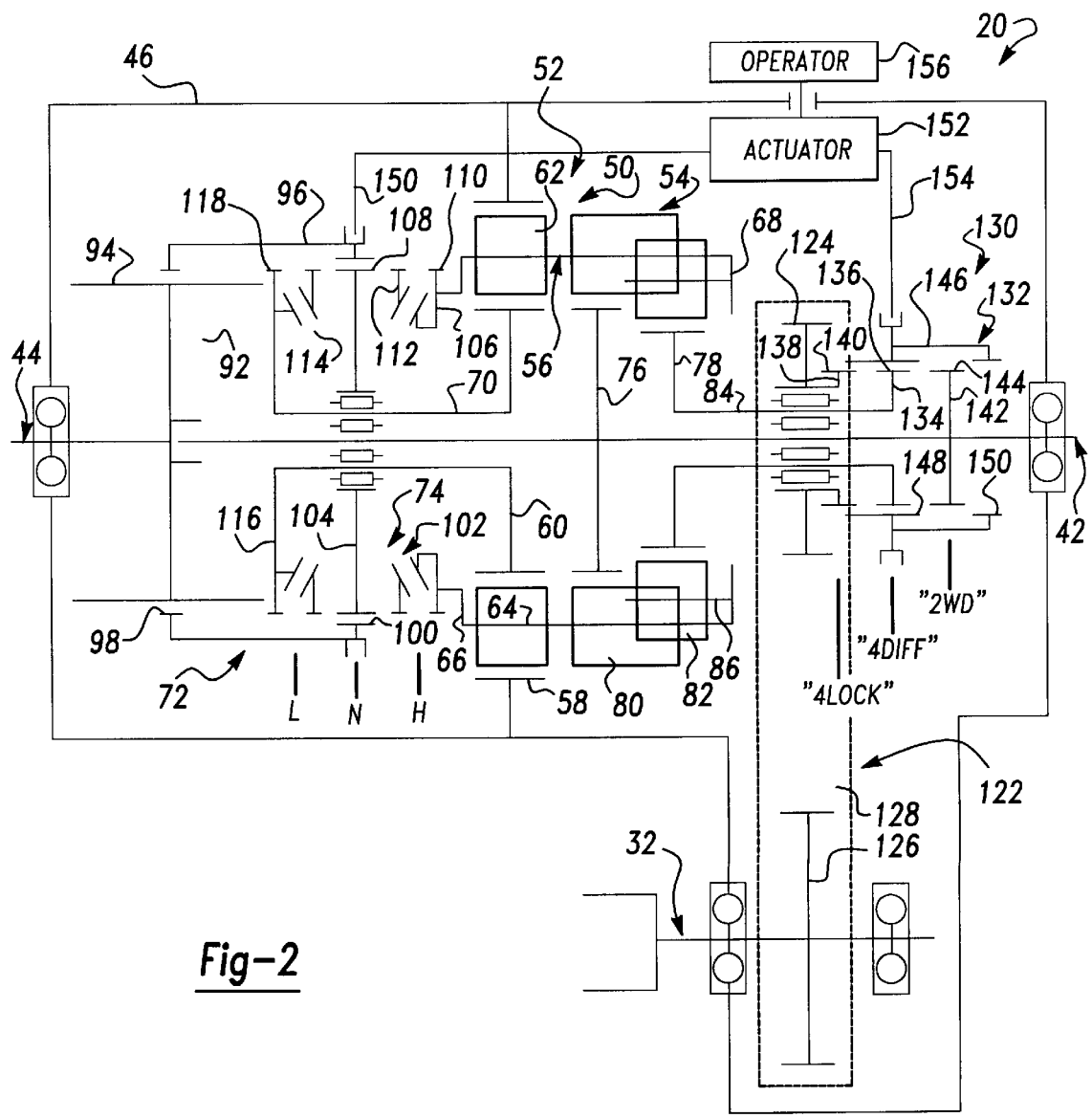
FIG. 2 is a schematic drawing of the transfer case of the present invention.

With particular reference to FIG. 2 of the drawings, transfer case 20 is schematically shown to include an input shaft 44 which is rotatably supported in a housing 46. Input shaft 44 is adapted for connection to an output shaft (not shown) of transmission 18 such that both are rotatably driven by engine 16 of the motor vehicle. Likewise, front output shaft 32 and rear output shaft 42 are rotatably supported in housing 46. Transfer case 20 is also shown to include a planetary gear assembly 50 which is operably installed between input shaft 44 and front and rear output shafts 32 and 42, respectively. Planetary gear assembly 50 includes a first gearset 52 and a second gearset 54 interconnected by a common carrier assembly 56. First gearset 52 is a simple planetary gear assembly including a ring gear 58 fixed to housing 46, a first sun gear 60, and a set of first pinion gears 62 which are each rotatably supported on a pinion shaft 64 and meshed with sun gear 60 and ring gear 58. Each pinion shaft 64 extends between a front carrier ring 66 and a rear carrier ring 68 which are interconnected to define carrier assembly 56. First sun gear 60 is fixed to a quill shaft 70 rotatably supported on rear output shaft 42.

As will be detailed hereinafter, first gearset 52 functions as a two-speed gear reduction unit which, in conjunction with a range clutch 72 of a synchronized range shift mechanism 74, is operable to establish a first or high-range speed ratio drive connection between input shaft 44 and carrier assembly 56 by directly coupling input shaft 44 to front carrier ring 66 of carrier assembly 56. Likewise, a second or low-range speed ratio drive connection is established by range clutch 72 between input shaft 44 and carrier assembly 56 by coupling input shaft 44 to first sun gear 60. A Neutral mode is established when input shaft 44 is uncoupled for both carrier assembly 56 and first sun gear 60.

With continued reference to FIG. 2, second gearset 54 is shown as a dual-planetary gear assembly which functions as an interaxle differential to permit speed differentiation and distribute drive torque between front output shaft 32 and rear output shaft 42. As will be detailed, carrier assembly 56, when driven at either of the high-range or low-range speed ratios, acts as the input of second gearset 54 and which has its outputs coupled to front output shaft 32 and rear output shaft 42. In particular, second gearset 54 includes a second sun gear 76, a third sun gear 78, a set of full-length or second pinion gears 80 each meshed with second sun gear 76, and a set of half-length or third pinion gears 82 each meshed with a corresponding one of second pinion gears 80 as well as with third sun gear 78. According to the embodiment shown, second sun gear 76 acts as a first output of second gearset 54 and is coupled for rotation with rear output shaft 42. Likewise, third sun gear 78 acts as a second output of second gearset 54 and is coupled to a transfer shaft 84 which is supported for rotation relative to rear output shaft 42. In addition, each second pinion gear 80 is rotatably supported on pinion shaft 64, the opposite ends of which are, as noted, mounted in front and rear carrier rings 66 and 68, respectively, of carrier assembly 56. Similarly, each third pinion gear 82 is rotatably supported on a pinion shaft 86, the opposite end of which are likewise mounted in front and rear carrier rings 66 and 68, respectively. According to the preferred embodiment, first sun gear 64 and second sun gear 76 have their gear teeth located at a first radial distance from the principle axis shared by rear output shaft 42 and input shaft 44, while the gear teeth of third sun gear 78 are located at a second lesser radial distance relative to the principle axis. As is known, the number of teeth for second sun gear 76, third sun gear 78, second pinion gears 80, and third pinion gears 82 can be selected to provide the desired drive torque distribution ratio across second gearset 54.

To provide means for selectively establishing the high-range and low-range drive connections between input shaft 44 and carrier assembly 56, synchronized range shift mechanism 74 is provided in conjunction with first gearset 52. As noted, synchronized range shift mechanism 74 is operable for permitting transfer case 20 to be shifted "on-the-fly" between its high-range and low-range drive modes. As also noted previously, synchronized range shift mechanism 74 includes range clutch 72 which is operable for selectively coupling input shaft 44 to either of carrier assembly 56 or first sun gear 60. In particular, range clutch 72 includes a drive gear or hub 92 that is fixed to input shaft 44. Drive hub 92 has an outer cylindrical rim on which external gear teeth or longitudinal splines 94 are formed. Range clutch 72 further includes a range sleeve 96 having a first set of internal splines 98 that are in constant mesh with external splines 94 on drive hub 92. Thus, range sleeve 96 is mounted for rotation with and axial sliding movement relative to drive hub 92 such that driven rotation of input shaft 44 causes concurrent rotation of range sleeve 96. Range sleeve 96 is shown to also include a second set of internal splines 100 which are offset axially from the first set of internal splines 98.

Range clutch 72 also includes a first synchronizer assembly 102 operably located between a neutral hub 104 rotatably supported on quill shaft 70 and a first clutch plate 106 which is fixed to front carrier ring 66 of carrier assembly 56. Neutral hub 104 has external splines 108 formed thereon while first clutch plate 106 has external clutch teeth 110 formed thereon. First synchronizer assembly 102 is operable for causing speed synchronization between input shaft 44 and carrier assembly 56 in response to movement of range sleeve 96 from a neutral position (denoted by position line "N") shown toward a high-range position (denoted by position line "H"). Once the speed synchronization process is completed, range sleeve 96 is permitted to move through a blocker ring 112 and into coupled engagement with first clutch plate 106 such that its splines 100 meshingly engage clutch teeth 110 on first clutch plate 106. Accordingly, with range sleeve 96 positioned in its H position, drive hub 92 is drivingly coupled to first clutch plate 106 such that carrier assembly 56 is coupled to rotate at the same speed as input shaft 44 for establishing the high-range drive connection.

Range clutch apparatus 72 further includes a second synchronizer assembly 114 operably disposed between neutral hub 104 and a second clutch plate 116 which is fixed to quill shaft 70 and has external clutch teeth 118 formed thereon. Second synchronizer assembly 114 is operable for causing speed synchronization between first sun gear 60 and input shaft 44 in response to movement of range sleeve 96 from its N position toward a low-range position (denoted by position line "L"). Once speed synchronization is complete, range sleeve 96 is permitted to move through a second blocker ring 120 and into coupled engagement with second clutch plate 116 such that its splines 100 meshingly engage clutch teeth 118 on second clutch plate 116 for establishing the low-range drive connection therebetween. With range sleeve 96 positioned in its L position, first sun gear 60 drives first pinion gears 62 about stationary ring gear 58 such that carrier assembly 56 is driven at a reduced speed ratio relative to input shaft 44, thereby establishing the low-range drive connection. While only schematically shown, first synchronizer assembly 102 and second synchronizer assembly 114 can be any conventional construction such as, for example, single-cone or dual-cone arrangements. Thus, it will be appreciated by those skilled in the art that any type of suitable synchronizer arrangement can be used for facilitating speed synchronization between the components that are to be directly coupled.

Range sleeve 96 is shown in its Neutral position (denoted by position line "N") whereat its splines 100 are released from engagement with clutch teeth 110 on first clutch plate 106 and clutch teeth 118 on second clutch plate 116 and yet are engaged with teeth 108 on neutral hub 104. As such, driven rotation of input shaft 44 causes rotation of range sleeve 96 and neutral hub 104 which, as noted, is rotatably supported on quill shaft 70. Since range sleeve 96 does not couple input shaft 44 to either of clutch plates 106 and 116 when it is in its N position, no drive torque is transferred through carrier assembly 56 to front and rear output shafts 32 and 42, respectively, thereby establishing the Neutral non-driven mode. While not intended to be scaled, FIG. 2 illustrates that splines 98 on range sleeve 96 maintain engagement with splines 94 on drive hub 92 throughout the entire length of axial travel of range sleeve 96 between its H and L positions. Moreover, splines 98 do not engage clutch teeth 118 on second clutch plate 116 when range sleeve 96 is in its H position.

As noted, second gearset 54 functions as the interaxle differential. Specifically, carrier assembly 56 is its input member while second sun gear 76 and third sun gear 78 are its output members. Thus, driven rotation of carrier assembly 56 via coupled engagement of range sleeve 96 with either carrier assembly 56 or first sun gear 60 causes a predetermined torque split (i.e., distribution ratio) to be transmitted to rear output shaft 42 through second sun gear 76 and to transfer shaft 84 through third sun gear 78. As seen, a transfer assembly 122 is provided for selectively transferring drive torque from transfer shaft 84 to front output shaft 32. Transfer assembly 122 includes a drive sprocket 124 rotatably supported on transfer shaft 84, a driven sprocket 126 fixed to front output shaft 32, and a continuous chain 128 interconnecting driven sprocket 126 to drive sprocket 124.

To provide means for selectively establishing at least three different drive connections between second gearset 54 and front and rear output shafts 32 and 42, respectively, transfer case 20 includes a mode shift mechanism 130. Mode shift mechanism 130 includes a mode clutch 132 which is operable for selectively coupling transfer shaft 84 to drive sprocket 124 for establishing a "full-time" four-wheel drive mode in which speed differentiation is permitted between front output shaft 32 and rear output shaft 42. Mode clutch 132 is also operable for selectively coupling transfer shaft 84 to drive sprocket 124 and rear output shaft 42 for establishing a "locked" four-wheel drive mode in which speed differentiation is inhibited between front output shaft 32 and rear output shaft 42. Finally, mode clutch 132 is operable for selectively uncoupling drive sprocket 124 from transfer shaft 84 and coupling transfer shaft 84 to rear output shaft 42 for establishing a two-wheel drive mode in which all drive torque is delivered to rear output shaft 42. Drive sprocket 124 is rotatably supported on transfer shaft 84 since, in the preferred embodiment disclosed, mode shift mechanism 130 is provided for permitting selective disengagement of drive sprocket 124 from transfer shaft 84 to establish the two-wheel drive mode in addition to the available full-time and locked four-wheel drive modes.

Mode clutch 132 includes a driven hub 134 fixed to transfer shaft 84 and having an outer cylindrical rim on which external splines 136 are formed, a first clutch plate 138 fixed to drive sprocket 124 and having an outer cylindrical rim with external clutch teeth 140 formed thereon, and a second clutch plate 142 fixed to rear output shaft 42 having an outer cylindrical rim with clutch teeth 144 formed thereon. Mode clutch 132 also includes a mode sleeve 146 having a first set of internal splines 148 which are in constant mesh with external spline 136 of driven hub 134 such that mode sleeve 146 can be slid axially relative thereto. Mode sleeve 146 is shown to also include a second set of internal splines 150 which are axially offset from the first set of splines 148. In FIG. 2, mode sleeve 146 is shown in a first or full-time four-wheel drive mode position (denoted by position line "4DIFF") whereat its first set of spline teeth 148 are also in meshed engagement with clutch teeth 140 on first clutch plate 138 and its second set of spline teeth 150 are disengaged from clutch teeth 144 on second clutch plate 142. In this mode position, transfer shaft 84 is coupled to drive sprocket 124 such that driven rotation of carrier assembly 56 causes drive torque to be distributed between second sun gear 76 and third sun gear 78 and respectively between rear output shaft 42 and front output shaft 32 while permitting speed differentiation therebetween, thereby establishing the full-time four-wheel drive mode. Forward axial movement of mode sleeve 146 from its 4DIFF position to a second or locked four-wheel drive mode position (denoted by position line "4LOCK") maintains engagement of clutch teeth 140 with mode sleeve splines 148 and causes the second set of mode sleeve splines 150 to engage clutch teeth 144 on second clutch plate 142. In this mode position, relative rotation between second sun gear 76 and third sun gear 78 is prevented for likewise preventing relative rotation between rear output shaft 42 and front output shaft 32, thereby establishing the non-differentiated or locked four-wheel drive mode. In contrast, rearward axial movement of mode sleeve 146 from its 4DIFF mode position to a third or two-wheel drive mode position (denoted by position line "2WD") causes splines 148 on mode sleeve 146 to disengage clutch teeth 140 on first clutch plate 138 and engage clutch teeth 144 on second clutch plate 142. In this mode position, drive sprocket is uncoupled from transfer shaft 84 and relative rotation is prevented between second sun gear 76 and third sun gear 78, thereby transmitting all drive torque to rear output shaft 42 for establishing the two-wheel drive mode. Thus, in both of the 4LOCK and 2WD mode positions, second gearset 54 is locked-up for preventing speed differentiation. In a four-wheel drive vehicle equipped with a live front axle, mode sleeve 146 can be shifted on-the-fly when the vehicle is travelling in a straight line since there is little, if any, relative rotation between front output shaft 32 and rear output shaft.

Referring still to FIG. 2, the shift system associated with transfer case 20 is shown to include a range fork 150 coupling range sleeve 72 to an actuator 152, a mode fork 154 coupling mode sleeve 146 to actuator 152, and an operator 156 for controlling selective actuation of actuator 152. Actuator 152 can be any suitable device that is operable to cause coordinated axial movement of range sleeve 72 and mode sleeve 146 in response to a particular drive mode selected by the vehicle operator via manipulation of operator 156. Alternatively, actuator 152 can be a pair of devices separately connected to each shift fork. Preferably, actuator 152 is a rotatable sector plate having range and mode cam arrangements for coordinated axial movement of shift forks 150 and 154 in a manner generally similar to that described in commonly owned U.S. Pat. No. 5,076,112, which is incorporated herein by reference. Additionally, operator 156 can be any suitable manually-actuated (i.e., a linkage coupling actuator 152 to a gearshift lever) or power-actuated (i.e., a gearmotor connected to actuator 152 and controlled by electric control signals from push-buttons or rotary switches) arrangement under the control of the vehicle operator for controlling actuation of actuator 152.

Referring to FIG. 3, a table is provided listing the combination of range positions of range sleeve 72 and mode positions of mode sleeve 146 establishing the various drive modes made available by transfer case 20. In particular, a two-wheel high-range drive mode (2WD-H) is established with range sleeve 72 in its H position and mode sleeve 146 in its 2WD position. A full-time four-wheel high-range drive mode (4DIFF-H) is established by shifting mode sleeve 146 to its 4DIFF position while range sleeve 72 is maintained in its H position. A locked four-wheel high-range drive mode (4LOCK-H) is established by moving mode sleeve 146 to its 4LOCK position while range sleeve 72 again is maintained in its H position. A locked four-wheel low-range drive mode (4LOCK-L) is established by maintaining mode sleeve 146 in its 4LOCK position while moving range sleeve 72 to its L position. A full-time four-wheel low-range drive mode (4DIFF-L) is established by moving mode sleeve 146 to its 4DIFF position while range sleeve 72 is maintained in its L position. A two-wheel low-range drive mode (2WD-L) is established by moving mode sleeve 146 to its 2WD position while range sleeve 72 is maintained in its L position. Finally, a Neutral mode is established by moving range sleeve to its N position while mode sleeve 146 is maintained in its 2WD position. While the above sequence of drive mode requires movement of only one of range sleeve 72 and mode sleeve 146 for selection of the next drive mode, the invention is not limited to such a sequence nor is it necessary that all seven of the drive modes be made available. In particular, the number of drive modes made available for selection via actuation of operator 156 can be selected based on the particular requirements of each different vehicular application.

Figure 4C:
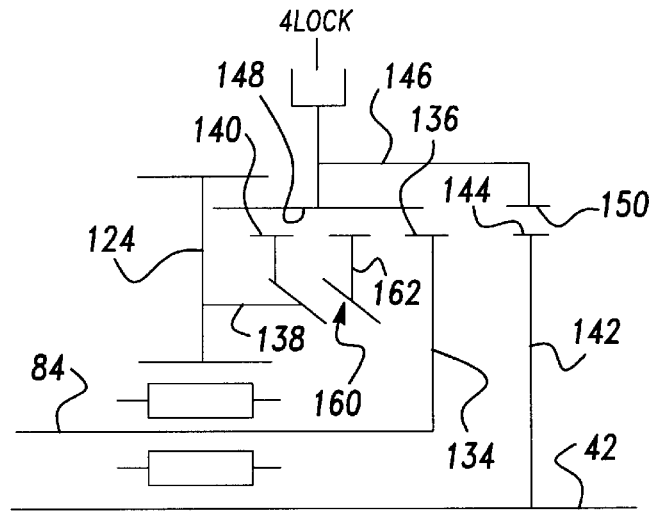

According to the embodiment shown in FIGS. 4A through 4C, mode shift mechanism 130 is now equipped with a synchronizer assembly 160 between driven hub 134 and first clutch plate 138 for permitting on-the-fly shifting of mode sleeve 146 between its 4DIFF and 2WD mode positions in those vehicle applications where front driveline 12 is equipped with an axle disconnect mechanism. In particular, this arrangement permits front wheels 24 to be disconnected from the remainder of axle assembly 26 via the use of conventional vacuum-actuated locking hubs or an axle-shaft disconnect system when transfer case is shifted into the two-wheel drive mode. This on-the-fly-synchronized mode shift system when used in conjunction with a disconnect system causes a substantial reduction in the inertial mass being driven by rolling action of front wheels 24 (i.e., front differential 28, front propshaft 30 and front output shaft 32) which results in improved fuel consumption and reduced component wear. A mode switch associated with operator 156 can provide a signal to the disconnect system indicating that transfer case 20 has been shifted into a two-wheel drive mode, thereby permitting subsequent disconnection of front wheels 24. Obviously, when transfer case 20 is shifted back into one of the four-wheel drive modes, the mode switch signal will provide an indication that front wheels 24 can be reconnected.

Synchronizer assembly 160 includes a blocker ring 162 disposed between mode sleeve 146 and first clutch plate 138. When mode sleeve 146 is initially moved from its 4DIFF mode position toward its 2WD position, synchronizer assembly 160 prevents mode sleeve splines 148 from passing through blocker ring 162 until speed synchronization between front output shaft 32 (via transfer assembly 22) and transfer shaft 84 is complete. Thereafter, splines 148 on mode sleeve 146 are permitted to engage clutch teeth 140 on first clutch plate 138, thereby releasably coupling transfer shaft 84 to drive sprocket 124.

Figure 5:
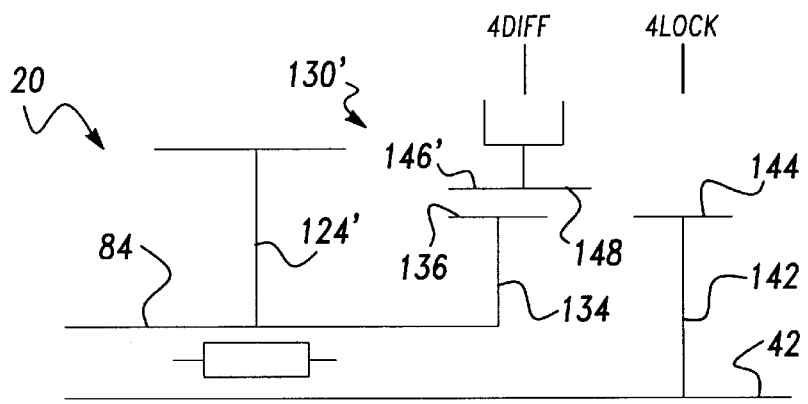
FIG. 5 is a partial schematic drawing of a transfer case according to another alternative embodiment of the present invention.

Referring to FIG. 5, a partial schematic view of transfer case 20 is shown to include a modified mode shift mechanism 130' wherein drive sprocket 124' is fixed to transfer shaft 84 such that the two-wheel drive mode feature has been eliminated. In particular, front output shaft 32 is continuously driven by third sun gear 78 via transfer shaft 84, drive sprocket 124', chain 128, and driven sprocket 126. As such, mode sleeve 146' is supported on driven hub 134 for rotation therewith and axial sliding movement thereon between the 4DIFF position shown and the 4LOCK position. As before, with mode sleeve 146' in the 4DIFF position, its splines 148 are disengaged from clutch teeth 144 on clutch plate 142 to permit differentiation between second sun gear 76 and third sun gear 78 and establish the full-time four-wheel drive mode. Movement of mode sleeve 146' to the 4LOCK position causes splines 148 to engage clutch teeth 144 on clutch plate 142 to rigidly couple driven hub 134 to clutch plate 142, thereby inhibiting speed differentiation between the output shafts and establishing the locked four-wheel drive mode If desired, mode shift arrangement 130' could be slightly rearranged with mode sleeve 146' supported on clutch plate 142 for movement between a 4DIFF position whereat mode sleeve 146' is uncoupled from hub 134 and a 4LOCK position whereat mode sleeve 146' is coupled to driven hub 134.

Figure 6A:
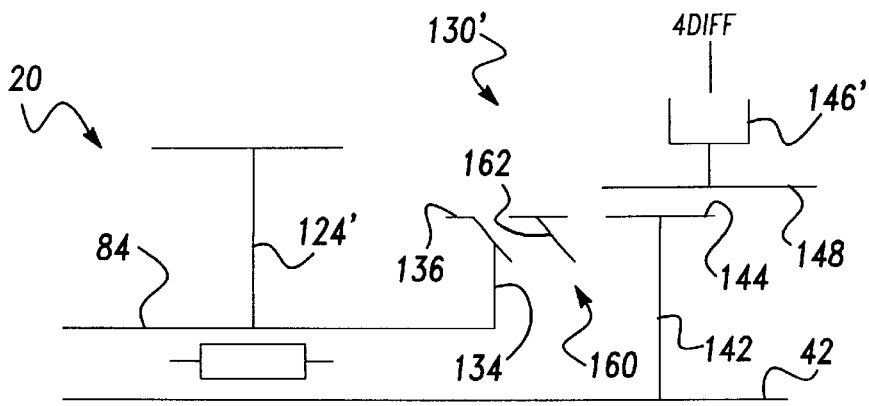
FIGS. 6A and 6B are partial schematic drawings of yet another alternative embodiment of the present invention.
Figure 6B:
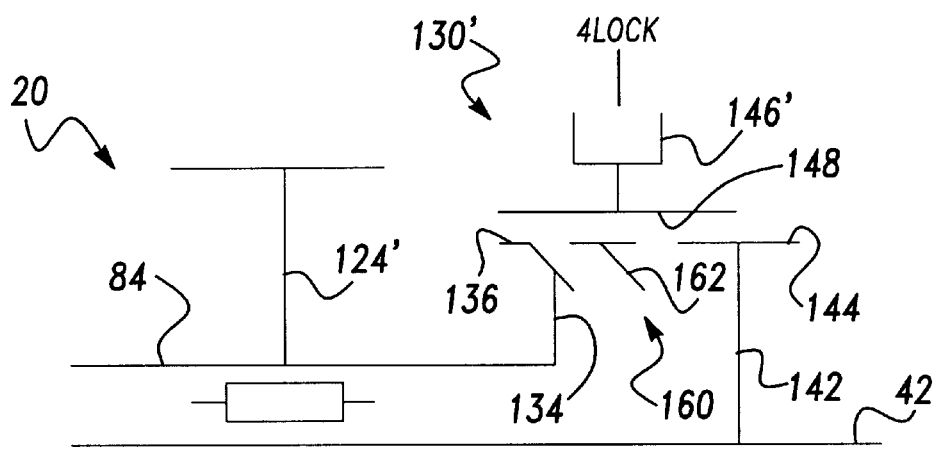

Referring now to FIGS. 6A and 6B, mode shift mechanism 130' is now equipped with a synchronizer assembly 160' between driven hub 134 and clutch plate 142 for permitting on-the-fly shifting of mode sleeve 146' between its 4DIFF and 4LOCK mode positions. Synchronizer assembly 160' includes blocker ring 162 disposed between mode sleeve 146' and driven hub 134. Mode sleeve 146' has its splined teeth 148 maintained in engagement with teeth 144 of clutch plate 142 and disengaged from teeth 136 on driven hub 134 when it is in its 4DIFF position shown in FIG. 6A. When it is desired to shift from the full-time four-wheel drive mode into the locked four-wheel drive mode, mode sleeve 146' is moved from its 4DIFF position toward the 4LOCK position shown in FIG. 6B. Synchronizer assembly 160' prevents teeth 148 on mode sleeve 146' from passing through blocker ring 162 until speed synchronization between transfer shaft 84 and rear output shaft 42 is complete. Thereafter, teeth 148 of mode sleeve 146' are permitted to engage teeth 136 on hub 134, thereby releasably coupling transfer shaft 84 for common rotation with rear output shaft 42.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A two-speed differential comprising:
    a rotary input member;
    first and second rotary output members;
    a planetary gearset including a first sun gear, a second sun gear fixed for rotation with said first output member, a third sun gear fixed for rotation with said second output member, a stationary ring gear, a carrier, a first planet gear rotatably supported on said carrier and meshed wit h said first sun gear and said ring gear, a second planet gear rotatably supported on said carrier and meshed with said second sun gear, and a third planet gear rotatably supported on said carrier and meshed with said third sun gear and said second planet gear; and
    a clutch for selectively coupling said input member to said carrier for establishing a first drive connection and for selectively coupling said input member to said first sun gear for establishing a second drive connection.

2. The two-speed differential of claim 1 wherein said carrier includes a first pinion shaft on which said first and second planet gears are rotatably supported, and a second pinion shaft on which said third planet gear is rotatably supported.

3. The two-speed differential of claim 1 wherein said clutch is a synchronizer clutch operable for causing speed synchronization between said input member and said carrier, and said synchronizer clutch is further operable for causing speed synchronization between said input member and said first sun gear.

4. The two-speed differential of claim 1 wherein said clutch includes a range sleeve rotatably driven by said input member and movable from a neutral position to a high-range position and a low-range position, said range sleeve is operable in its high-range position to couple said carrier to said input member such that said carrier is directly driven by said input member, said range sleeve is operable in its low-range position to couple said first sun gear to said input member such that said carrier is driven by said input member at a reduced speed, and said range sleeve is operable in said neutral position to uncouple said input member from said carrier and said first sun gear.

5. The two-speed differential of claim 4 wherein said clutch includes a first synchronizer operably disposed between said carrier and said input member for inhibiting movement of said range sleeve to its high-range position until speed synchronization is established therebetween, and a second synchronizer operably disposed between said first sun gear and said input member for inhibiting movement of said range sleeve to its low-range position until speed synchronization is established therebetween.

6. The two-speed differential of claim 5 wherein said clutch further includes a drive hub fixed for rotation with said input member and on which said range sleeve is supported for rotation therewith and sliding movement thereon between its high-range, low-range and neutral positions, a first clutch plate fixed to said carrier, and a second clutch plate fixed to said first sun gear, wherein said first synchronizer is disposed between said drive hub and said first clutch plate for inhibiting movement of said range sleeve into locked engagement with said first clutch plate until speed synchronization is established therebetween, and wherein said second synchronizer is disposed between said drive hub and said second clutch plate for inhibiting movement of said range sleeve to its low-range position whereat said range sleeve is coupled to said second clutch plate until speed synchronization is established therebetween.

7. A two-speed differential comprising:
   a rotary input member;
   first and second rotary output members;
   a planetary gearset including a first sun gear, a second sun gear fixed for rotation with said first output member, a third sun gear fixed for rotation with said second output member, a stationary ring gear, a carrier, a first planet gear rotatably supported on said carrier and meshed with said first sun gear and said ring gear, a second planet gear rotatably supported on said carrier and meshed with said second sun gear, and a third planet gear rotatably supported on said carrier and meshed with said third sun gear and said second planet gear; and a range sleeve driven by said input member and movable between a first position and a second position, said range sleeve is operable in its first position to couple said carrier to said input member such that said carrier is driven at a first speed ratio relative to said input member, and said range sleeve is operable in its second position to couple said first sun gear to said input member such that said carrier is driven at a second speed ratio relative to said input member.

8. The two-speed differential of claim 7 wherein said carrier includes a first pinion shaft on which said first and second planet gears are rotatably supported, and a second pinion shaft on which said third planet gear is rotatably supported.

9. The two-speed differential of claim 7 wherein said clutch is a synchronizer clutch operable for causing speed synchronization between said input member and said carrier, and said synchronizer clutch is further operable for causing speed synchronization between said input member and said first sun gear.

10. The two-speed differential of claim 9 wherein said synchronizer clutch includes a first synchronizer operably disposed between said carrier and said input member for inhibiting movement of said range sleeve to its first position until speed synchronization is established therebetween, and a second synchronizer operably disposed between said first sun gear and said input member for inhibiting movement of said range sleeve to its second position until speed synchronization is established therebetween.

11. The two-speed differential of claim 10 wherein said synchronizer clutch further includes a drive hub fixed for rotation with said input member and on which said range sleeve is supported for rotation and sliding movement thereon between its first and second positions, a first clutch plate fixed to said carrier, and a second clutch plate fixed to said first sun gear, wherein said first synchronizer is disposed between said drive hub and said first clutch plate for inhibiting movement of said range sleeve into its first position whereat said range sleeve is coupled to said first clutch plate until speed synchronization is established therebetween, and wherein said second synchronizer is disposed between said drive hub and said second clutch plate for inhibiting movement of said range sleeve to its second position whereat said range sleeve is coupled to said second clutch plate until speed synchronization is established therebetween.

* * * * *